April 3, 1951  J. J. McDONALD  2,547,481
BEVERAGE DISPENSING APPARATUS WITH RECIRCULATING MEANS
Filed May 1, 1945  2 Sheets-Sheet 2
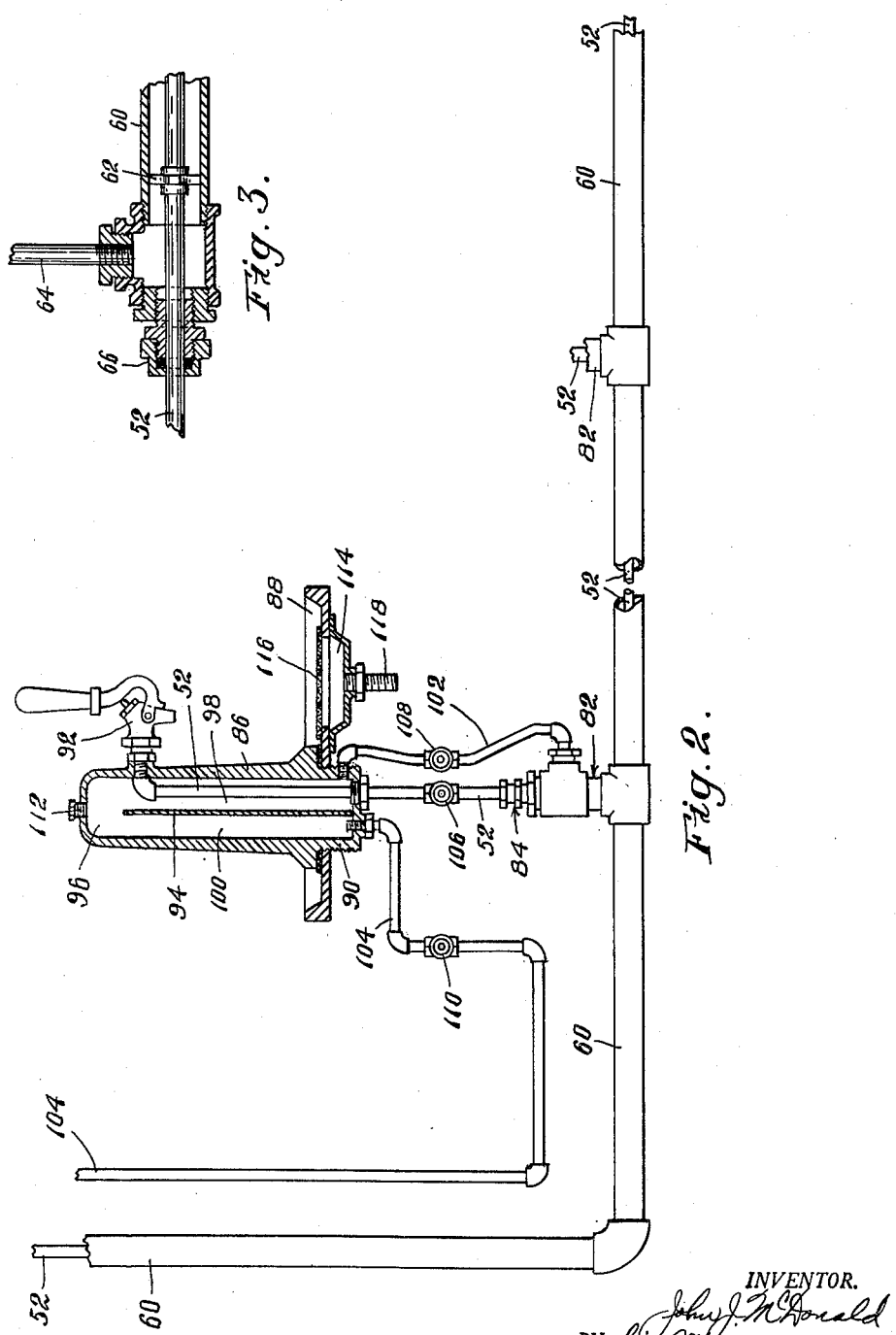
INVENTOR.
John J. McDonald
BY his Atty
John H. McKenna Patented Apr. 3, 1951

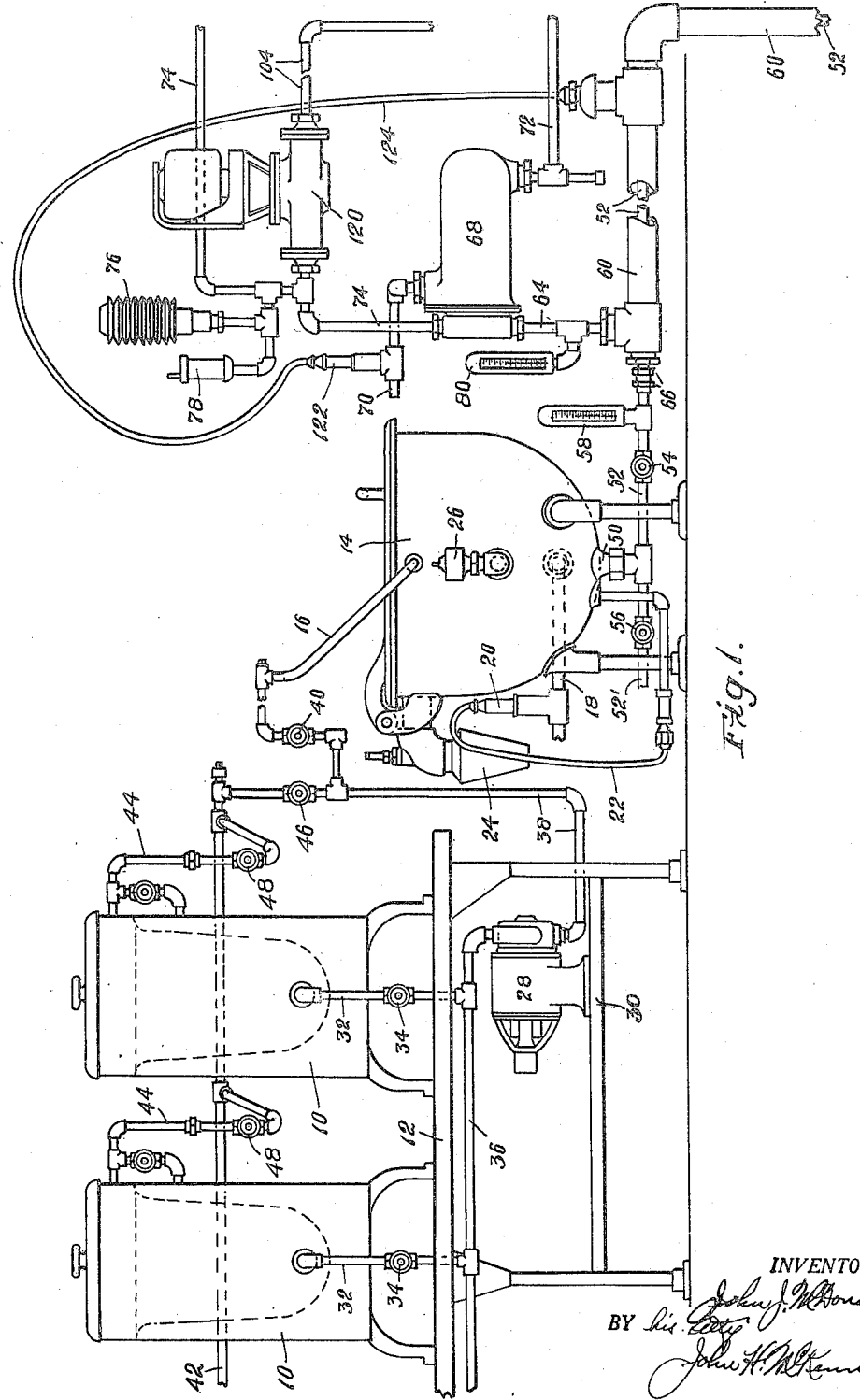

2,547,481

UNITED STATES PATENT OFFICE 2,547,481

BEVERAGE DISPENSING APPARATUS WITH RECIRCULATING MEANS

John J. McDonald, Newton, Mass.; William J. McDonald, executor of said John J. McDonald, deceased, assignor to The McDonald Company, Boston, Mass., a corporation of Massachusetts Application May 1, 1945, Serial No. 591,272

1 Claim. (Cl. 225—21)

This invention relates to beverage dispensing apparatus and more particularly to a beverage distributing and dispensing apparatus wherein the beverage may be maintained at a predetermined temperature while being distributed and until actually drawn off at one or at any of several dispensing locations.

The invention is herein disclosed in its application to a hot coffee making, distributing and dispensing system suitable for providing hot coffee for relatively large numbers of people, such as in industrial establishments, institutions and the like, where large demands are made on the coffee supplying and dispensing equipment. However, it should be understood that my invention may be utilized for dispensing other hot liquids, and its various features are readily adaptable for cooling and dispensing cold liquids by substitution of refrigerating means for the herein disclosed heating means.

It is among the objects of the invention to provide a beverage distributing and dispensing apparatus wherein the beverage to be dispensed is maintained at a predetermined temperature in the distributing system and in the dispensing device or devices notwithstanding that a dispensing device may be remote from the source of the beverage and from the mechanism for elevating or lowering its temperature to the predetermined extent.

Another object is to provide, in connection with a beverage making mechanism, a beverage storage reservoir and a distributing system leading from the reservoir to one or more beverage dispensing devices, said distributing system including means automatically responsive for restoring a predetermined temperature of the beverage therein whenever the temperature of the beverage in the distributing system departs a substantial amount from said predetermined temperature.

Still another object is to provide a hot beverage dispensing apparatus including a closed hot water system jacketing the hot beverage distributing pipes.

Yet another object is to provide a dispensing device having provision for maintaining the temperature of liquid to be dispensed at a predetermined temperature until actually dispensed.

It is, moreover, my purpose and object generally to improve upon prior liquid distributing and dispensing apparatus.

In the accompanying drawings:

Figure 1 is an elevation, somewhat diagrammatic, showing a hot coffee making, storing and distributing apparatus embodying features of my invention;

Figure 2 is an elevation, partly in section, showing a dispensing apparatus constituting a part of my invention; and Figure 3 is a detail cross-sectional view at the entrance end of the water-jacketed portion of my apparatus.

Referring to the drawings, the coffee urns 10 may be of well known construction and ordinarily will have the usual standard equipment such as gages and draw-off taps, which are omitted from the drawings as constituting no part of my invention. The urns 10 are shown supported on a suitable table 12, which may have as many urns as desired thereon. While only two of the urns 10 are herein represented, I prefer to employ in the system disclosed three urns, each having capacity for making ten gallons of coffee.

Beside the table 12, or at any other convenient location, I provide a steam jacketed vat 14 constituting a storage reservoir into which coffee may be delivered from one or all of the urns 10 through pipe 16. Steam from any suitable source delivers into the jacket of vat 14 through pipe 18, and a thermostat-controlled valve 20 in pipe 18 operates to admit live steam whenever the temperature within the steam jacket drops below a predetermined temperature as communicated to the valve 20 through the thermostat-control tube 22. Steam from the jacket exhausts through the condenser funnel 24 wherein it becomes condensed in any well known manner, as by coming in contact with a water spray (not shown) interiorly of the funnel, a suitable receptacle or waste pipe (not shown) being arranged below the funnel to catch the drip therefrom, and a pressure relief valve 26 being provided in the steam jacket for safety purposes.

The vat 14 may have a capacity of ten gallons, for example, and may be provided with any well known type of float-controlled valve (not shown) for preventing rise of the coffee level therein beyond a predetermined level. Hence, in a three urn system there will be a combined coffee-holding capacity of forty gallons. However, in operation, each urn in succession will be making coffee and temporarily will be cut off from pipe 16 leading to vat 14, so that, usually, thirty gallons or thereabout of made coffee will be available at any time for distribution and dispensing, assuming that coffee is being drawn from the system at a considerable rate while any one urn is making coffee.

An electric motor and pump unit 28 is mounted on shelf 30 of the table 12 for pumping coffee from the urns 10 to the vat 14, and for circulating the coffee through the urns at times when the vat is full and its float valve closed against admission of more coffee. Each urn has a discharge pipe 32 with hand valve 34 therein, and all of the pipes 32 open into pipe 36 which leads to the suction side of the motor-pump unit 28. The delivery side of the motor-pump unit 28 has connected thereto a pipe 38 to which the vat supply pipe 16 is connected, a hand valve 40 being provided in line 38, 16 permitting manual cut-off of the supply of coffee to vat 14. Pipe 38 extends beyond its connection to pipe 16 and opens into circulation pipe 42 which has a branch connection 44 leading into the upper part of each urn 10, both the extension of pipe 38 and each branch connection 44 having manual valves 46 and 48 respectively by means of which the circulation system may be cut off, by closing valve 46, or any desired one or more urns may be cut out of the circulation system by closing the proper one or more of the valves 48.

Coffee from vat 14 flows through its bottom outlet 50 into pipe 52 of the coffee distributing system, a hand valve 54 in pipe 52 on the distributing side of vat 14 controlling flow of coffee into the distributing system, and an extension pipe 52', on the other side of the vat constituting means for draining the vat, being controlled by manual valve 56 which normally remains closed. A thermometer 58 in pipe 52, adjacent to the vat, indicates the temperature of the coffee discharging from the vat 14.

Beyond the thermometer 58, pipe 52 extends into and axially of a substantially larger diameter pipe 60 which constitutes a water jacket around the coffee distributing pipe 52. Pipe 52 extends, thus jacketed by pipe 60, to one or more dispensing locations, at each of which a dispensing mechanism is located, as illustrated in Fig. 2. Coffee distributing pipe 52 is supported and maintained centered within pipe 60 by suitably spaced spiders 62.

Hot water is delivered into jacket 60 through pipe 64, as best seen in the detail showing of Fig. 3, which shows the entrance end of jacket 60 and a water-tight fitting at 66 around pipe 52 where it enters the jacket.

Hot water pipe 64 leads through the jacket 60 from a steam heating unit indicated generally at 68, which may be a known type of steam jacketed unit having a steam inlet pipe 70 from any suitable source and an exhaust pipe 72 to waste. Water to be heated enters the unit through pipe 74 from any suitable source, which conveniently may be the regular water system of the building in which my apparatus is installed. An accordion type expansion chamber 76 is connected in water supply pipe 74, as also a pressure relief valve 78. Preferably a thermometer 80 is connected in the hot water pipe 64 between heating unit 68 and water jacket 60 for indicating the temperature of the water being delivered into jacket 60.

At a dispensing location, represented in Fig. 2, the jacketed coffee distributing pipe 52 extends vertically upward, as at 82, where the pipe 52 extends out of its jacket through the water-tight fitting 84 and enters the dispensing dome 86. The dome 86 is secured on dispensing table 88 as by having a closed bottom cylindrical part 90 exteriorly threaded and screwed into a hole in the table. The coffee distributing pipe 52 passes through the bottom of cylindrical part 90 of the dome and extends interiorly of the dome to near its upper end, where it turns and leads out through the side wall of the dome where it is equipped with a suitable dispensing tap or faucet 92.

The interior of dome 86 is divided by the vertical partition 94 which extends from the bottom of cylindrical part 90 to near the top of the dome, leaving a top passage 96 over the top of the partition connecting the two interior chambers 98, 100. Just below the point where pipe 52 leaves the water jacket 60, a pipe 102 opens out of the jacket and extends upward and into the dome chamber 98, so that hot water from the jacket 60 is discharged into chamber 98, around the coffee distributing pipe 52 therein, to maintain the coffee hot until it actually is dispensed at the tap or faucet 92. The hot water in chamber 98 circulates over the top of partition 94 into chamber 100 whence it is conducted back through pipe 104 to the heating unit 68 for re-circulation in the closed system as described. Hand valves 106, 108 and 110 are provided in the pipes 52, 102 and 104 respectively below the table 88 for controlling flow in the pipes.

Obviously, as many dispensing stations as desired may be connected in the jacketed line 60, as suggested in Fig. 2.

The top of the dome 86 is provided with a screw 112 for exhausting air which may become entrapped in the dome. Table 88 has a basin 114 covered by a suitable screen or grating 116, with a drain pipe 118 for the basin which may be connected to any convenient waste line such as the building sewerage system.

It will be obvious from the foregoing description that my hot water system is a closed system in which the water circulates through heater 68 and through the dispensing dome or domes 86. Such circulation is assured by providing a pump 120 in the return line 104 adjacent the water supply pipe 74 into which water in pipe 104 delivers in returning to the heater 68.

I assure that the hot water in jacket 60 of the distributing pipes will be maintained approximately at a predetermined suitable high temperature as well as in the dispensing dome or domes 86 by incorporating a thermally controlled valve 122 in the steam pipe 70 leading to the steam jacket of heater 68, and a thermal bulb or other thermally responsive element projected into the water jacket 60 at one or more strategic locations in the distributing system has connection through tube 124 to the valve 122 for effecting opening of valve 122 whenever the hot water at said strategic location drops below a predetermined temperature thereby to admit live steam to heater 68 for restoring the temperature of the water in jacket 60. Obviously, as many of these thermally responsive elements as may be desired or necessary may be connected to valve 122 so that any one of a number of distributed thermal elements may call for more heating of the hot water.

It is a feature of my invention as applied to a coffee dispensing system that a required large amount of made coffee can be maintained ever ready for dispensing steaming hot at distributed locations which may be considerable distances from the coffee making urns 10. However, the made coffee, having left the urns, is free of the coffee grounds during subsequent heatings, ensuring preservation of the initial qualities of the coffee when dispensed some time later at the dispensing locations. The large drain on the coffee system which is occasioned when hundreds of workers file in continuous procession past a coffee dispenser, each taking a cup of coffee, as happens at meal time in defense plants, for example, is adequately and efficiently met with my apparatus with a minimum of costly devices for ensuring maintenance of the required supply, at the required places, at the right time, and in a wanted steaming hot flavorful condition.

I claim as my invention:

In a coffee making and distributing apparatus, a plurality of coffee brewing urns, a jacketed storage reservoir adjacent the urns, the jacket of said storage reservoir being connected to a source of heating medium, a supply pipe extending between the urns and the storage reservoir and having branches connected in parallel with said urns, a pump in circuit with said supply pipe for pumping coffee from the urns into the storage reservoir, a return pipe having branches in parallel with the urns and connected to the supply pipe at a point intermediate the pump and the storage reservoir, independently operable valves in the branches of the return pipe, a valve for opening and closing communication between the return pipe and the supply pipe to allow flowing coffee from the urns to the storage reservoir or for recirculating coffee through the supply and return pipes and the urns, a dispensing device remotely located from the storage reservoir, a delivery pipe extending between the storage reservoir and the dispensing device, a water jacket surrounding the delivery pipe for a substantial distance along the length thereof and terminating adjacent the dispensing device, a water return pipe connected to said water jacket, a pump for continuously circulating water through said water pipe and water return pipe, a water heater for heating the water circulating through said water pipe and water return pipe, and a thermostatically-controlled valve responsive to the temperature of the water in the water jacket for controlling the temperature of said water heater.

JOHN J. McDONALD.

REFERENCES CITED

The following references are of record in the file of this patent:

UNITED STATES PATENTS

| Number | Name | Date |
| --- | --- | --- |
| 382,111 | Sargeant | May 1, 1888 |
| 1,237,357 | Maker | Aug. 21, 1917 |
| 1,389,628 | Clark | Sept. 6, 1921 |
| 1,882,247 | Levings | Oct. 11, 1932 |
| 1,668,540 | McAllen | May 1, 1928 |
| 1,981,171 | Greenwald et al. | Nov. 20, 1934 |
| 2,066,703 | Stephens | Jan. 5, 1937 |
| 2,140,816 | Seitz | Dec. 20, 1938 |
| 2,153,335 | Martin | Apr. 4, 1939 |
| 2,228,648 | Welles | Jan. 14, 1941 |
| 2,321,906 | Gair | June 15, 1943 |
| 2,430,501 | Galbally | Nov. 11, 1947 |